(12) United States Patent
Olsen

(10) Patent No.: US 9,835,271 B2
(45) Date of Patent: Dec. 5, 2017

(54) BRACKET AND USE

(71) Applicant: NGI A/S, Nørresundby (DK)

(72) Inventor: Tomas Hecht Olsen, Nørresundby (DK)

(73) Assignee: NGI A/S (DK)

( * ) Notice: Subject to any disclaimer, the term of this patent is extended or adjusted under 35 U.S.C. 154(b) by 0 days.

(21) Appl. No.: 14/895,331

(22) PCT Filed: Jun. 17, 2014

(86) PCT No.: PCT/DK2014/050168
§ 371 (c)(1),
(2) Date: Dec. 2, 2015

(87) PCT Pub. No.: WO2015/000485
PCT Pub. Date: Jan. 8, 2015

(65) Prior Publication Data
US 2016/0116083 A1   Apr. 28, 2016

(30) Foreign Application Priority Data

Jul. 1, 2013 (DK) .................................. 2013 00401
Nov. 13, 2013 (DK) .................................. 2013 00643

(51) Int. Cl.
*F16L 3/08* (2006.01)
*F16L 3/10* (2006.01)
(Continued)

(52) U.S. Cl.
CPC .............. *F16L 3/1091* (2013.01); *F16B 2/06* (2013.01); *F16L 3/11* (2013.01); *F16L 55/035* (2013.01);
(Continued)

(58) Field of Classification Search
CPC ......... F16L 3/1091; F16L 3/11; F16L 55/035; F16L 2201/40; F16B 2/06; F16B 2/065; F16B 7/0433
(Continued)

(56) References Cited

U.S. PATENT DOCUMENTS 3,606,218 A    9/1971  Enlund
4,290,311 A *  9/1981  Brewer .................. G01L 9/0002
                                                              73/114.51
(Continued)

FOREIGN PATENT DOCUMENTS

DE          29505312       5/1995
EP           2034227       3/2009

*Primary Examiner* — Todd M Epps
(74) *Attorney, Agent, or Firm* — Ware, Fressola, Maguire & Barber LLP

(57) ABSTRACT

A bracket for pipe profiles includes a body with a center hole for enclosing a pipe profile in the center hole where the body includes at least two non-elastic bracket parts with internal surfaces towards the center hole and external surfaces. The bracket parts' internal surfaces include at least two radial spokes with spoke end surfaces for contact against the pipe profile. A ring shaped elastic gasket may be placed around each spoke end surface, which together with the spoke end surfaces has contact against the pipe profile. The invention also includes use of the bracket for mounting pipe profiles. The bracket has a shape, which ensures hygienic tight connection between bracket and pipe profile and the pipe profile is mechanically supported. The bracket can therefore be used in environments with high hygiene requirements, for example in the foodstuff industry.

20 Claims, 3 Drawing Sheets

(51) Int. Cl.
    *F16L 3/11*            (2006.01)
    *F16L 55/035*      (2006.01)
    *F16B 2/06*           (2006.01)
    *F16B 7/04*           (2006.01)

(52) U.S. Cl.
    CPC ............ *F16B 2/065* (2013.01); *F16B 7/0433* (2013.01); *F16L 2201/40* (2013.01)

(58) Field of Classification Search
    USPC ............... 248/74.4, 74.2, 74.1; 138/106, 107
    See application file for complete search history.

(56) References Cited

U.S. PATENT DOCUMENTS 9,038,968 B2 * 5/2015 Hennon ................ F16L 3/1091
                                                                                    248/65
9,512,714 B2 * 12/2016 Sobolewski ............ E21B 47/01

\* cited by examiner

BRACKET AND USE

CROSS-REFERENCE TO RELATED APPLICATIONS

This application is a U.S. national state of International Appl. No. PCT/DK2014/050168 filed 17 Jun. 2014, which claimed priority to Danish Appl. Nos. PA 2013 00401 filed 1 Jul. 2013 and PA 2013 0064 filed 13 Nov. 2013, which applications are incorporated herein by reference in their entireties.

TECHNICAL FIELD

The invention relates to a bracket for pipe profiles including a body with a center hole for enclosing a pipe profile in the center hole where the body includes at least two non-elastic bracket parts with internal surfaces towards the center hole and external surfaces and where the bracket parts' internal surfaces include at least two radial spokes with spoke end surfaces for contact against the pipe profile.

The invention also relates to use of the bracket for mounting a pipe profile.

BACKGROUND

Conventional pipe brackets for the food industry and the pharmaceutical industry are traditionally metal brackets with a lining of rubber in which the pipe rests on and by having such a shape it has certain hygiene and cleaning advantages compared to brackets based on only metal.

Such pipe brackets will, however, typically not be able to achieve hygienic approval according to the 3A and EHEDG requirements, which are specified by respectively 3A, which is an independent organisation for promoting hygienic equipment for the food industry, beverage industry and the pharmaceutical industry and EHEDG, European Hygienic Engineering & Design Group, which is a consortium of manufacturers of equipment for e.g. the food industry for promoting hygienic conditions in relation to food production.

It has been found that there are some drawbacks of this known technique, including that the known bracket types have typically got surfaces on which filth or process water can accumulate and which are difficult to clean and drain.

Moreover, the brackets are mechanically unstable since the rubber lining typically expands over time and thereby loosens the grip around the pipe profile, and the "liquid" mounting of the pipes results in a mechanically unstable assembly of pipe frames or pipe stands.

The rubber lining also results in that there is not an electrical contact between pipe and bracket and thereby not the same potential through the whole construction. This results in a risk of corrosion and risk of explosion in atmospheres with e.g. hydrogen.

DE 29505312 U (HESTERBERG) 06.07.1995 describes a pipe holder including a body with a center hole where the body includes at least two nonelastic bracket parts with internal surfaces towards the center hole and external surfaces and where the bracket parts' internal surfaces include at least two radial spokes with spoke end surfaces.

It is, however, a drawback of the pipe holder described in DE 2950512 U that filth can accumulate between the pipe holder and the pipe, which is to be fixed, whereby the pipe holder cannot be used in applications where special hygiene requirements must be met, for example with the A and EHEDG standards.

SUMMARY OF THE INVENTION

It is therefore an object of the invention to show a bracket for pipe profiles without the above mentioned drawbacks.

The object of the invention is achieved by a bracket for pipe profiles having a body with a center hole for enclosing a pipe profile in the center hole, wherein the body comprises at least two non-elastic bracket parts with internal surfaces towards the center hole and external surfaces and the internal surfaces of the non-elastic bracket parts comprise at least two radial spokes having spoke end surfaces for contact against the pipe profile, in which bracket a ring shaped elastic seal is placed around each spoke end surface, which together with the spoke end surfaces have contact against the pipe profile.

In this way it is thus possible to achieve a mounting of the pipe profile in the bracket according to the invention where the connection between the bracket and the pipe profile is sealed in a hygienic way and the pipe profile is mechanically supported by contact from the nonelastic end surfaces from the bracket's spokes against the pipe profile.

The spoke end surfaces are preferably arched with an arching with a radius corresponding to the pipe profile's radius.

It should in the context of the invention be understood that the bracket parts' internal surfaces turn towards the pipe profile while the bracket parts' external surfaces face away from the pipe profile.

In the context of the invention, "nonelastic" should be understood as non-deformable and mechanically stable under normal use, as it is understood by a professional within the machine industry, such as metal items and items from hard plastic.

In the context of the invention, similar to "elastic" is understood deformable and sealing during typical use, as it is understood by a professional within the machine industry such as rubber gaskets or PTFE gaskets.

With the bracket's two bracket parts, which together consist the bracket's body, it is achieved that the bracket can be mounted on existing pipe constructions without the need for them being separated and the bracket can subsequently be moved and adjusted without disassembly of the pipe construction.

It should in the context of the invention be understood that the two bracket parts together on their internal surfaces have placed the, at least two, radial spokes. The two spokes can thus be placed on each own bracket part, which eases and improves the contact against the pipe profile or they can be placed on the same bracket part. The two spokes can thus be arranged on the first bracket part while the second bracket part is thus used to mount and fasten the body around the pipe profile. The other bracket part can thus be a closing joint for the bracket with a dimension similar to the pipe profile, which just allows the first bracket part to be mounted on the pipe profile in the pipe construction without it being disassembled. The closing joint can even have a smaller dimension than the pipe profile, which will still allow adjusting for wear and moving, but not retrofitting on an existing pipe construction.

The bracket parts' internal surfaces can advantageously include at least three radial spokes. With three spokes a more mechanically stable contact against the pipe profile is ensured.

In a bracket with three spokes, two spokes will typically be arranged on a first bracket part while the third spoke is placed on another bracket part.

This ensures a good contact against the pipe profile and subsequent adjustment possibilities.

For large pipe profiles, brackets with a higher number of spokes can with advantage be used, for instance 4, 5, 6, 7, 8, 9, 10 spokes or an even higher number.

The ring shaped elastic gaskets can with advantage be placed in recesses in each of the spoke end surfaces' peripheries. With such a placement of the ring shaped elastic gaskets it is possible to achieve that the gaskets' surface against the pipe profiles and the spoke end surfaces consist one plane, meaning that the gaskets "are level" with the spoke end surfaces, which ensures an additionally improved contact against the pipe profile such that the gasket is not overloaded during contact but stressed exactly so much that the connection is sealed.

If the side surfaces of the gaskets furthermore flush with the spokes' side surfaces, an additional cleaning friendly shape of spoke unit and sealing unit is ensured.

The recesses are preferably shaped in such a way that the gaskets are placed on them tightly and they do thus not fall off during mounting of the bracket.

In a preferred embodiment of the invention, the ring shaped elastic gaskets are designed in one or more polymeric materials from the group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from the group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM).

These materials are sufficiently flexible in terms of sealing and are also approved by 3A and EHEDG for use in industries with special hygiene requirements.

The mentioned materials preferably have a Shore A value in the interval 40-70, additionally preferably in the interval 50-60.

The ring shaped elastic gaskets are preferably manufactured from nitrile-butadiene rubber (NBR), which is especially suited for sealing purposes.

The bracket parts for the bracket according to the invention are preferably manufactured from metal or a non elastic polymer.

Design of the bracket parts in metal ensures a good electrical contact to a pipe profile in metal and thereby makes it possible to have the same electrochemical potential through the whole pipe construction.

The bracket parts are with this embodiment preferably designed in the same material as the pipe profile. With the same material for the bracket parts and pipe profile, those corrosion problems that the use of materials with different electrochemical potentials would otherwise cause are avoided.

Bracket parts in metal can alternatively be used in combination with pipe profiles from other materials, for example polymeric materials.

Preferred metals or composites include stainless steel, preferably chrome-nickel-steel and copper or brass.

Design of the bracket parts in non elastic polymeric materials can with advantage be used for pipe constructions from similar or other polymers, but can also be used for pipe constructions from other materials, for example metal. Design of the bracket parts in non elastic polymer material allows use of inexpensive and mechanically stable construction materials.

In a preferred embodiment, the bracket parts are fully or partially designed from a fire-retardant polymer.

In a preferred embodiment, the fire-retardant polymer is chosen from the following group: a polyurethane plastic, a unsaturated polyester, a polystyrene, a PVC or a polyethylene, which polymers are added with fire-retardant items.

The fire-retardant item depends on the chosen polymer. For example, an ordinary polyethylene can be made fire-resistant with chlorinated PE (CPE) with a chlorine content of maximum 4%. Halogenous paraffins can also be used, for example in combination with antimony trioxide or phosphorus. The chlorine content in pure PVC can make the PVC self extinguishing. Antimony compounds can be used for fire retardation of polystyrene. Unsaturated polyester can be made fire-retardant by adding non-reactive additives such as dichlorstyrene and triallylphosphate.

For polyurethane, reactive fire retardants can be used with content of phosphorus and/or halogens.

In a preferred embodiment, the bracket parts are fully or partially designed from an electrically conducting polymer.

In a preferred embodiment, the electrically conducting polymer is a polypropylene.

The polypropylene can be a thermoplastic added with carbon powder. An example of this is Pre-Elec® PP 1375.

Another example is a polypropylene block copolymer such as 11% Sabic PP412MN40®.

For the bracket parts according to this embodiment of the invention is used preferably the same types of polymer as for the elastic gaskets, meaning homopolymer acetal or copolymer acetal (POM), ethylene tetrafluoroethylene copolymer (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC), though typically in hardened or fiber enforced versions for achieving Shore D-values in the interval 60-90, preferably 70-80.

The bracket is, according to the invention, preferably shaped such that the bracket parts' internal and external surfaces are shaped with rounded geometry. With such a rounded geometry without sharp edges and connections a high cleaning friendliness of the bracket is ensured.

The bracket, according to the invention, can also preferably be designed with bracket parts where the internal and external surfaces are shaped without horizontal surfaces. The bracket, according to this embodiment of the invention, is easy to drain of process water.

The bracket, according to the invention, can also preferably be designed with bracket parts where the internal and external surfaces have a roughness with an RA-value under 0.8. The bracket parts' surfaces can alternatively have roughness with RA-values above 0.8, which however for 3A or EHEDG approval requires that a further specified washing test according to 3A and EHEDG requirements can be passed for the bracket.

The bracket, according to the invention, is preferably designed with elastic distance pieces for separation of the bracket parts. Such elastic distance pieces ensure a flexible fixing of the bracket and thereby a good contact against the pipe profile.

The distance pieces can with advantage be designed from materials from the same material groups as the elastic gaskets, meaning that they are designed from one or more polymeric materials from the group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from the group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

The bracket's bracket parts can furthermore with advantage be fixed by bolts with lock washers designed from similar materials, meaning from one or more polymeric materials from the group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from the group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

The bracket can, according to the invention, with advantage additionally include a mounting device with an assembly disc designed from similar materials, meaning in one or more polymeric materials from the group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from the group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

Design of distance pieces, lock washers and/or assembly discs from these materials is hygienic and contributes to high cleaning friendliness of the bracket.

The assembly device can with advantage by placed by a spoke where the material thickness will allow a mechanically stable fixing of the assembly device, preferably with a bolt with internal or external hexagon in a socket in the bracket part's external surface and/or in the spoke.

If the socket is placed in the spoke, the central part of the spoke end surface is preferably recessed such that the spoke end surface only has contact with the pipe profile with a ring shaped contact surface around the recessed central part of the spoke end surface.

The assembly device allows that the bracket is mounted either vertically or horizontally on other machine parts and thus stabilizes the pipe construction further.

The bracket, according to the invention, can by use of the assembly device with advantage include an additional similar body for mounting on a neighbour pipe profile, such that the two bodies are mutually mounted, which enables further mechanical stabilization of the pipe construction. In this regard, the elastic assembly disc ensures possibility of adjusting the angle between the neighbour brackets without compromising stress or cracks in the construction occurring.

The bracket, according to the invention, can also be mounted at the end of a pipe profile for connecting two pipe profiles or for ending a pipe profile.

According to another aspect, the invention includes use of the bracket according to the invention for mounting a pipe profile, preferably for use in the foodstuff industry.

The invention also relates to a method for manufacturing a bracket as described above and where the bracket is manufactured by a two component process whereby the bracket parts and the elastic gaskets are manufactured and assembled in one casting process.

In an alternative method, the invention includes that the bracket is manufactured by the bracket parts being produced in a first process and that the elastic gaskets are manufactured in another process, different from the first, and that the bracket parts and the elastic gaskets are subsequently by a third process assembled for creating a bracket.

BRIEF DESCRIPTION OF THE DRAWINGS

The invention will now be explained further with reference to the drawings, in which.

DETAILED DESCRIPTION OF THE INVENTION

Figure 1:
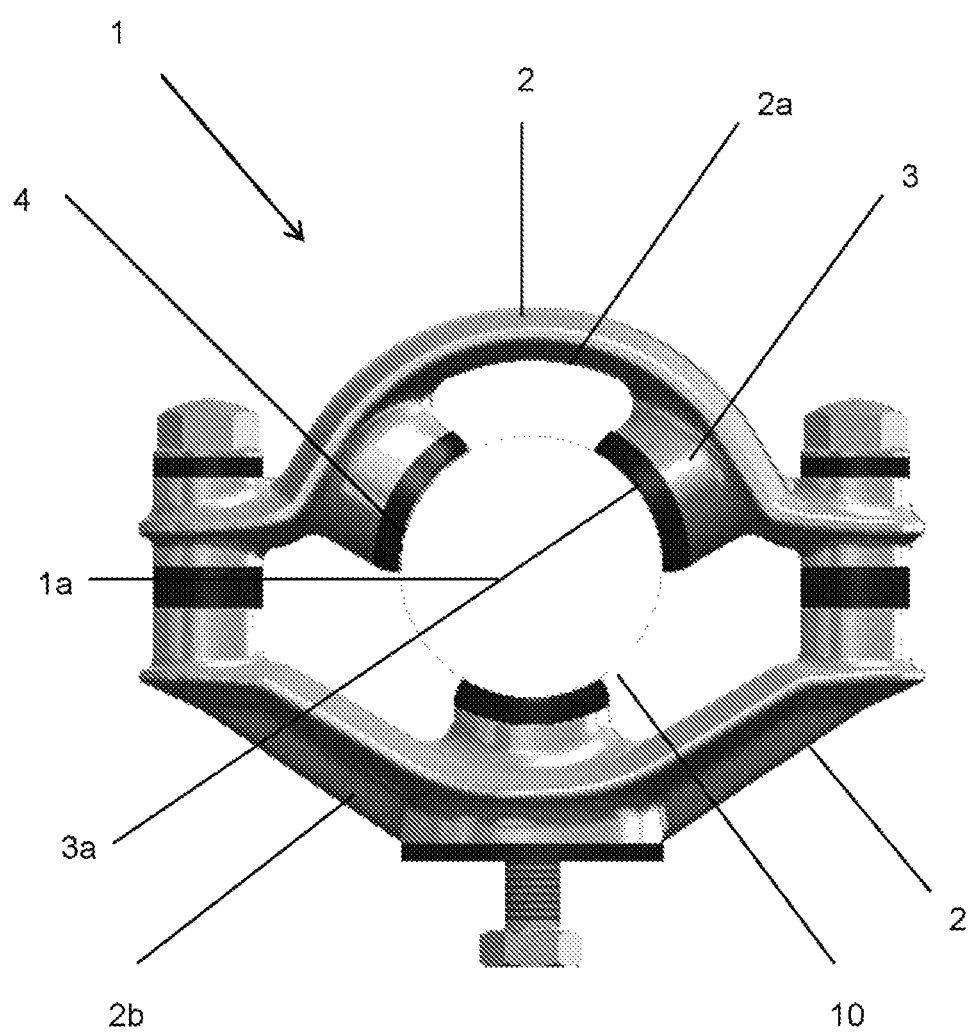
FIG. 1 shows the bracket according to the invention.

In FIG. 1 is with 1 shown the bracket according to the invention, which includes two non elastic bracket parts 2 with internal surfaces 2a against a center hole 1a, and external surfaces 2b and with three radial spokes 3 with spoke end surfaces 3a, which have contact against the pipe profile 10 (outlined) and where there is placed elastic gaskets 4 around each spoke end surface 3A, which together with the spoke end surfaces 3a forms contact against the pipe profile 10.

Figure 2:
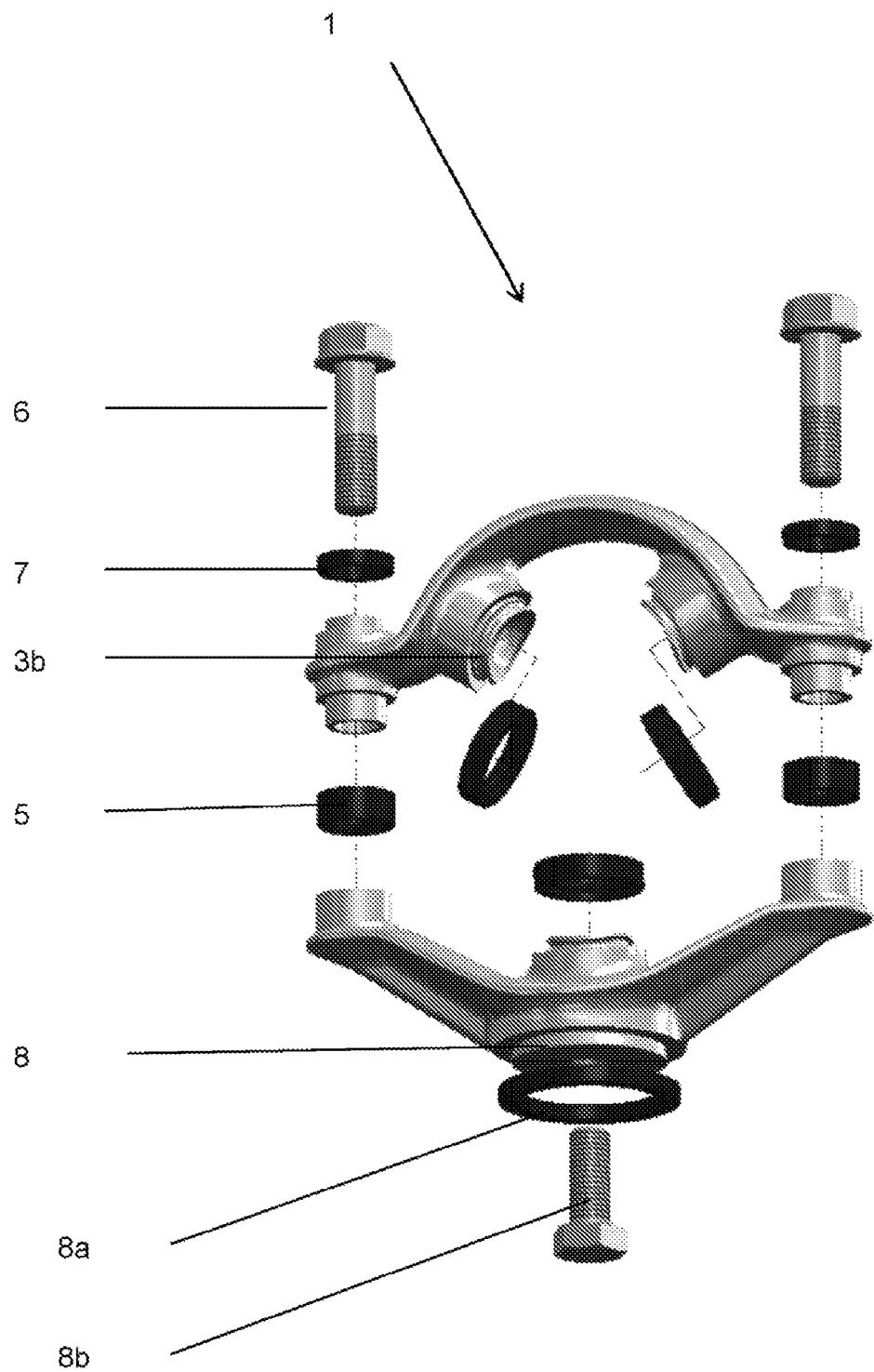
FIG. 2 shows an exploded view of the bracket according to the invention.

In FIG. 2 is shown additional elements of the bracket 1, namely elastic distance pieces 5, which separate the bracket parts 2 and bolts 6, which fix the bracket parts 2, and which are provided with lock washers 7. The figure also shows the mounting device 8 with the mounting disc 8a and a hexagonal bolt 8b for mounting.

Figure 3:
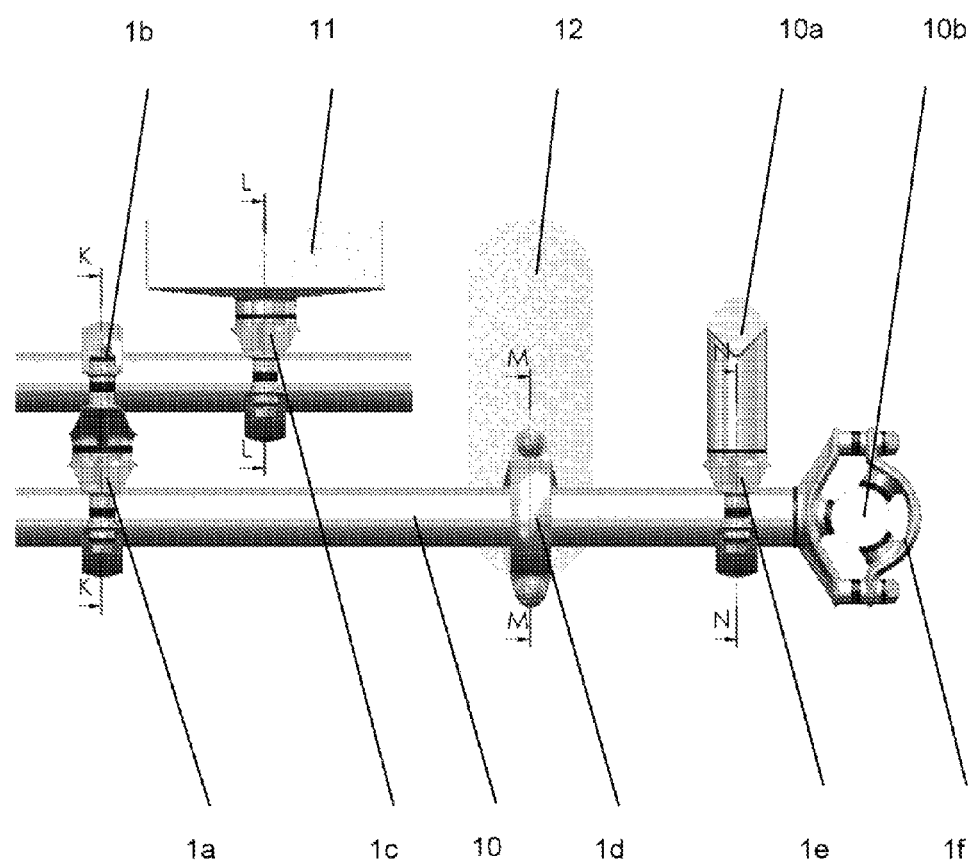
FIG. 3 shows applications of the bracket according to the invention.

FIG. 3 shows a number of applications of the bracket 1, which in this figure are stated with 1a, 1c, 1d, 1e and 1f. The figure thus shows with center line K mounting of the bracket 1a against a neighbour bracket 1b with center line L vertical mounting of the bracket 1c against a machine part 11 with center line M horizontal mounting of the bracket 1d against a machine part 12 with center line N vertical mounting of the bracket 1e against an end of a pipe profile 10a for ending it, and finally with the bracket 1f mounting of a pipe profile 10b (outlined) concurrent with the end of the pipe profile 10.

The invention claimed is:

1. A bracket for pipe profiles, comprising:
a body with a center hole for enclosing a pipe profile in the center hole, wherein the body comprises at least two non-elastic bracket parts with internal surfaces towards the center hole and external surfaces;
wherein the internal surfaces of the non-elastic bracket parts comprise at least two radial spokes having spoke end surfaces for contact against the pipe profile; and
wherein a ring shaped elastic seal is placed around each spoke end surface, which together with the spoke end surfaces have contact against the pipe profile.

2. The bracket according to claim 1, wherein the at least two radial spokes comprise three radial spokes.

3. The bracket according to claim 1, wherein each of the ring shaped elastic seals are placed in recesses in peripheries of each of the spoke end surfaces.

4. The bracket according to claim 1, wherein the ring shaped elastic seals are designed in one or more polymeric materials from a group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from a group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

5. The bracket according to claim 1, wherein the non-elastic bracket parts are designed from metal or a non-elastic polymer.

6. The bracket according to claim 1, wherein the non-elastic bracket parts are fully or partially designed from a fire retardant polymer.

7. The bracket according to claim 6, wherein the polymer is chosen from a group including: a polyurethane plastic, a unsaturated polyester, a polystyrene, a PVC or a polyethylene, which polymers are added with fire-retardant items.

8. The bracket according to claim 1, wherein the non-elastic bracket parts are fully or partially designed from an electrically conducting polymer.

9. The bracket according to claim 8, wherein the electrically conducting polymer is a polypropylene.

10. The bracket according to claim 9, wherein the non-elastic bracket parts are held together by bolts with lock washers designed from one or more polymeric materials from a group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from a group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

11. The bracket according to claim 1, wherein the non-elastic bracket parts are designed from a material with a same electro chemical potential as the pipe profile.

12. The bracket according to claim 1, wherein the internal and external surfaces of the non-elastic bracket parts are designed with rounded geometry.

13. The bracket according to claim 1, wherein the internal and external surfaces of the non-elastic bracket parts are shaped without horizontal surfaces.

14. The bracket according to claim 13, wherein at least two non-elastic bracket parts are mutually mounted by using a mounting device.

15. The bracket according to claim 1, wherein the non-elastic bracket parts are separated by elastic distance pieces.

16. The bracket according to claim 15, wherein the elastic distance pieces are designed in one or more polymeric materials from a group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from a group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

17. The bracket according to claim 1, wherein the bracket further comprises a mounting device with an assembly disc designed from one or more polymeric materials from a group of polymeric materials including homopolymer acetal or copolymer acetal (POM), ethylene tetrafluoroethylene (ETFE), perfluoroalkoxy resin (PFA), Polytetrafluoroethylene (PTFE) or modified version of this, Polyvinylidenfluorid (PVDF), fluorinated ethylene-propylene copolymer (FEP), polycarbonate (PC), polyetheretherketone (PEEK), polyethersulfone (PESU), High-density polyethylene (HDPE), polyphenylensulfone (PPSU), Polypropylene (PP), polysulfone (PSU) and non-plastified Polyvinyl chloride (PVC) or from one or more elastomer materials from a group of elastomer materials including ethylene-propylene-diene-monomer (EPDM), fluoroelastomer (FKM), hydrogenated nitrile butadiene rubber (HNBR), natural rubber (NR), nitrile-butadiene rubber (NBR), silicone rubber (VMQ) and perfluoroelastomers (FFKM), preferably from nitrile-butadiene rubber (NBR).

18. The bracket according to claim 17, wherein the mounting device is placed by a spoke.

19. A method for manufacturing the bracket according to claim 1, comprising manufacturing the bracket by a two component process including manufacturing and assembling the non-elastic bracket parts and the elastic seals in one casting process.

20. A method for manufacturing the bracket according to claim 1, comprising manufacturing the bracket by a process including manufacturing the non-elastic bracket parts in a first process, manufacturing the elastic seals in a second process different from the first process, and subsequently assembling the non-elastic bracket parts and the elastic seals in a third process for creating the bracket.

\* \* \* \* \*